(12) United States Patent
Marshall et al.

(10) Patent No.: US 11,880,477 B2
(45) Date of Patent: **\*Jan. 23, 2024**

(54) TIME-BASED FUNCTIONALITY RESTRICTIONS

(71) Applicant: AirWatch LLC, Atlanta, GA (US)

(72) Inventors: John Marshall, Atlanta, GA (US); Erich Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 554 days.

This patent is subject to a terminal disclaimer.

(21) Appl. No.: 16/986,465

(22) Filed: Aug. 6, 2020

(65) Prior Publication Data

US 2020/0380151 A1    Dec. 3, 2020

Related U.S. Application Data

(63) Continuation of application No. 13/862,380, filed on Apr. 13, 2013, now Pat. No. 10,754,966.

(51) Int. Cl.
*H04L 9/40* (2022.01)
*G06F 21/62* (2013.01)

(52) U.S. Cl.
CPC ........ *G06F 21/6218* (2013.01); *H04L 63/102* (2013.01); *H04L 63/108* (2013.01); *G06F 2221/2137* (2013.01); *H04L 63/20* (2013.01)

(58) Field of Classification Search
None
See application file for complete search history.

(56) References Cited

U.S. PATENT DOCUMENTS

| | | |
|---|---|---|
| 5,574,786 A | 11/1996 | Dayan et al. |
| 5,740,395 A | 4/1998 | Wells et al. |
| 5,987,609 A | 11/1999 | Hasebe |
| 6,021,492 A | 2/2000 | May |
| 6,023,708 A | 2/2000 | Mendez et al. |
| 6,085,192 A | 7/2000 | Mendez et al. |
| 6,131,096 A | 10/2000 | Ng et al. |
| 6,131,116 A | 10/2000 | Riggins et al. |
| 6,151,606 A | 11/2000 | Mendez |
| 6,233,341 B1 | 5/2001 | Riggins |

(Continued)

FOREIGN PATENT DOCUMENTS

| | | |
|---|---|---|
| CA | 2149337 A1 | 6/1994 |
| GB | 2346716 A | 8/2000 |

(Continued)

OTHER PUBLICATIONS

Asynchrony Software, Inc., , "PDA Defense User Guide", 726, 2002.

(Continued)

*Primary Examiner* — Fatoumata Traore
(74) *Attorney, Agent, or Firm* — King Intellectual Asset Management

(57) ABSTRACT

Time-based functionality restrictions may be provided. Periodic scans may be performed to identify requests to perform functions on user devices, to determine whether the functions are compliant with compliance rules associated with the user devices that specify time periods during which the user devices are authorized to perform the functions, and to perform remedial actions if the functions are not compliant with the compliance rules.

21 Claims, 3 Drawing Sheets

(56) References Cited

U.S. PATENT DOCUMENTS

| | | | |
|---|---|---|---|
| 6,560,772 B1 | 5/2003 | Slinger | |
| 6,708,221 B1 | 3/2004 | Mendez et al. | |
| 6,714,859 B2 | 3/2004 | Jones | |
| 6,726,106 B1 | 4/2004 | Han et al. | |
| 6,727,856 B1 | 4/2004 | Hill | |
| 6,741,232 B1 | 5/2004 | Siedlikowski et al. | |
| 6,741,927 B2 | 5/2004 | Jones | |
| 6,766,454 B1 | 7/2004 | Riggins | |
| 6,779,118 B1 | 8/2004 | Ikudome et al. | |
| 6,904,359 B2 | 6/2005 | Jones | |
| 6,965,876 B2 | 11/2005 | Dabbiere | |
| 6,995,749 B2 | 2/2006 | Friend | |
| 7,032,181 B1 | 4/2006 | Farcasiu | |
| 7,039,394 B2 | 5/2006 | Bhaskaran | |
| 7,039,679 B2 | 5/2006 | Mendez et al. | |
| 7,064,688 B2 | 6/2006 | Collins et al. | |
| 7,092,943 B2 | 8/2006 | Roese et al. | |
| 7,107,339 B1 | 9/2006 | Wolters | |
| 7,184,801 B2 | 2/2007 | Farcasiu | |
| 7,191,058 B2 | 3/2007 | Laird et al. | |
| 7,203,959 B2 | 4/2007 | Nachenberg et al. | |
| 7,225,231 B2 | 5/2007 | Mendez et al. | |
| 7,228,383 B2 | 6/2007 | Friedman et al. | |
| 7,275,073 B2 | 9/2007 | Ganji et al. | |
| 7,284,045 B1 | 10/2007 | Marl et al. | |
| 7,287,271 B1 | 10/2007 | Riggins | |
| 7,308,703 B2 | 12/2007 | Wright et al. | |
| 7,310,535 B1 | 12/2007 | MacKenzie et al. | |
| 7,353,533 B2 | 4/2008 | Wright et al. | |
| 7,363,349 B2 | 4/2008 | Friedman et al. | |
| 7,363,361 B2 | 4/2008 | Tewari et al. | |
| 7,373,517 B1 | 5/2008 | Riggins | |
| 7,437,752 B2 | 10/2008 | Heard et al. | |
| 7,444,375 B2 | 10/2008 | McConnell et al. | |
| 7,447,506 B1 | 11/2008 | MacKenzie et al. | |
| 7,447,799 B2 | 11/2008 | Kushner | |
| 7,475,152 B2 | 1/2009 | Chan et al. | |
| 7,496,957 B2 | 2/2009 | Howard et al. | |
| 7,539,665 B2 | 5/2009 | Mendez | |
| 7,565,314 B2 | 7/2009 | Borgeson et al. | |
| 7,590,403 B1 | 9/2009 | House et al. | |
| 7,594,224 B2 | 9/2009 | Patrick et al. | |
| 7,603,547 B2 | 10/2009 | Patrick et al. | |
| 7,603,548 B2 | 10/2009 | Patrick et al. | |
| 7,603,703 B2 | 10/2009 | Craft et al. | |
| 7,617,222 B2 | 11/2009 | Coulthard et al. | |
| 7,620,001 B2 | 11/2009 | Ganji | |
| 7,620,392 B1 | 11/2009 | Maurya et al. | |
| 7,650,491 B2 | 1/2010 | Craft et al. | |
| 7,660,902 B2 | 2/2010 | Graham et al. | |
| 7,665,118 B2 | 2/2010 | Mann et al. | |
| 7,665,125 B2 | 2/2010 | Heard et al. | |
| 7,685,645 B2 | 3/2010 | Doyle et al. | |
| 7,702,322 B1 | 4/2010 | Maurya et al. | |
| 7,702,785 B2 | 4/2010 | Bruton et al. | |
| 7,735,112 B2 | 6/2010 | Kim et al. | |
| 7,735,122 B1 | 6/2010 | Johnson et al. | |
| 7,739,334 B1 | 6/2010 | Ng et al. | |
| 7,752,166 B2 | 7/2010 | Quinlan et al. | |
| 7,788,382 B1 | 8/2010 | Jones et al. | |
| 7,792,297 B1 | 9/2010 | Piccionelli et al. | |
| 7,840,631 B2 | 11/2010 | Farcasiu | |
| 7,890,091 B2 | 2/2011 | Puskoor et al. | |
| 7,912,896 B2 | 3/2011 | Wolovitz et al. | |
| 7,917,641 B2 | 3/2011 | Crampton | |
| 7,970,386 B2 | 6/2011 | Bhat et al. | |
| 8,001,082 B1 | 8/2011 | Muratov | |
| 8,012,219 B2 | 9/2011 | Mendez et al. | |
| 8,041,776 B2 | 10/2011 | Friedman et al. | |
| 8,046,823 B1 | 10/2011 | Begen et al. | |
| 8,060,074 B2 | 11/2011 | Danford et al. | |
| 8,069,144 B2 | 11/2011 | Quinlan et al. | |
| 8,078,157 B2 | 12/2011 | Maurya et al. | |
| 8,094,591 B1 | 1/2012 | Hunter et al. | |
| 8,117,344 B2 | 2/2012 | Mendez et al. | |
| 8,150,431 B2 | 4/2012 | Wolovitz et al. | |
| 8,225,381 B2 | 7/2012 | Lemke | |
| 8,332,350 B2 | 12/2012 | Pulfer et al. | |
| 8,713,173 B2 * | 4/2014 | Kacherov | H04L 63/20 709/224 |
| 8,756,390 B2 | 6/2014 | Chu et al. | |
| 8,769,063 B2 * | 7/2014 | Barton | G06F 21/335 709/229 |
| 9,307,451 B1 | 4/2016 | Kodeswaran et al. | |
| 2002/0013721 A1 | 1/2002 | Dabbiere et al. | |
| 2003/0110084 A1 | 6/2003 | Eberhard et al. | |
| 2003/0204716 A1 | 10/2003 | Rockwood et al. | |
| 2004/0123153 A1 | 6/2004 | Wright et al. | |
| 2004/0181687 A1 | 9/2004 | Nachenberg et al. | |
| 2004/0224703 A1 | 11/2004 | Takaki et al. | |
| 2005/0246192 A1 | 11/2005 | Jauffred et al. | |
| 2006/0190984 A1 | 8/2006 | Heard et al. | |
| 2007/0033397 A1 | 2/2007 | Phillips et al. | |
| 2007/0136492 A1 | 6/2007 | Blum et al. | |
| 2007/0156897 A1 | 7/2007 | Lim | |
| 2007/0174433 A1 | 7/2007 | Mendez et al. | |
| 2007/0261099 A1 | 11/2007 | Broussard et al. | |
| 2007/0266422 A1 | 11/2007 | Germano et al. | |
| 2007/0288637 A1 | 12/2007 | Ayton et al. | |
| 2008/0133712 A1 | 6/2008 | Friedman et al. | |
| 2008/0134176 A1 | 6/2008 | Fitzgerald et al. | |
| 2008/0134305 A1 | 6/2008 | Hinton et al. | |
| 2008/0134347 A1 | 6/2008 | Goyal et al. | |
| 2008/0201453 A1 | 8/2008 | Assenmacher | |
| 2008/0228504 A1 | 9/2008 | Nguyen et al. | |
| 2009/0036111 A1 | 2/2009 | Danford et al. | |
| 2009/0077621 A1 | 3/2009 | Lang et al. | |
| 2009/0144632 A1 | 6/2009 | Mendez | |
| 2009/0198997 A1 | 8/2009 | Yeap et al. | |
| 2009/0260064 A1 | 10/2009 | McDowell et al. | |
| 2009/0300739 A1 | 12/2009 | Nice et al. | |
| 2009/0307362 A1 | 12/2009 | Mendez et al. | |
| 2010/0005125 A1 | 1/2010 | Mendez et al. | |
| 2010/0005157 A1 | 1/2010 | Mendez et al. | |
| 2010/0005195 A1 | 1/2010 | Mendez et al. | |
| 2010/0023630 A1 | 1/2010 | Mendez et al. | |
| 2010/0100641 A1 | 4/2010 | Quinlan et al. | |
| 2010/0120450 A1 | 5/2010 | Herz | |
| 2010/0138371 A1 | 6/2010 | Ishii | |
| 2010/0144323 A1 | 6/2010 | Collins et al. | |
| 2010/0146269 A1 | 6/2010 | Baskaran | |
| 2010/0254410 A1 | 10/2010 | Collins | |
| 2010/0268844 A1 | 10/2010 | Quinlan et al. | |
| 2010/0273456 A1 | 10/2010 | Wolovitz et al. | |
| 2010/0299152 A1 | 11/2010 | Batchu et al. | |
| 2010/0299362 A1 | 11/2010 | Osmond | |
| 2010/0299376 A1 | 11/2010 | Batchu et al. | |
| 2010/0299719 A1 | 11/2010 | Burks et al. | |
| 2011/0004941 A1 | 1/2011 | Mendez et al. | |
| 2011/0082900 A1 | 4/2011 | Nagpal et al. | |
| 2011/0113062 A1 | 5/2011 | Quinlan et al. | |
| 2011/0145932 A1 | 6/2011 | Nerger et al. | |
| 2011/0153779 A1 | 6/2011 | Mendez et al. | |
| 2011/0153799 A1 | 6/2011 | Ito | |
| 2011/0167474 A1 | 7/2011 | Sinha et al. | |
| 2011/0202589 A1 | 8/2011 | Piernot et al. | |
| 2011/0225252 A1 | 9/2011 | Bhat et al. | |
| 2011/0270799 A1 | 11/2011 | Muratov | |
| 2011/0276805 A1 | 11/2011 | Nagpal et al. | |
| 2011/0296186 A1 | 12/2011 | Wong et al. | |
| 2011/0320552 A1 | 12/2011 | Friedman et al. | |
| 2012/0005578 A1 | 1/2012 | Hawkins | |
| 2012/0015644 A1 | 1/2012 | Danford et al. | |
| 2012/0032945 A1 * | 2/2012 | Dare | G06F 3/0488 345/418 |
| 2012/0102392 A1 | 4/2012 | Reesman et al. | |
| 2012/0198547 A1 | 8/2012 | Fredette et al. | |
| 2012/0246303 A1 * | 9/2012 | Petersen | G06F 16/1734 709/224 |
| 2012/0302204 A1 * | 11/2012 | Gupta | H04M 3/42221 455/406 |

(56) References Cited

U.S. PATENT DOCUMENTS

2013/0061307 A1    3/2013  Livne
2013/0152169 A1    6/2013  Stuntebeck
2014/0007182 A1*   1/2014  Qureshi .............. G06F 21/6218
                                                            726/1

FOREIGN PATENT DOCUMENTS

WO         0241661 A2    5/2002
WO     WO-2014155498 A1 * 10/2014  ............. G06F 21/34

OTHER PUBLICATIONS

Belani, Eshwar et al., "The CRISIS Wide Area Security Architecture", 726, 1998.
Benaloh, Josh et al., "Patient Controlled Encryption: Ensuring Privacy of Electronic Medical Records", 726, Nov. 13, 2009.
Fox, Armando et al., "Security on the Move: Indirect Authentication Using Kerberos", 726, 1996.
Menaria, Pankaj et al., "Security in Mobile Database Systems", 707, 726, Mar. 17, 2011.
Pfitzmann, Andreas et al., "Mobile User Devices and Security Modules: Design for Trustworthiness", 726, Feb. 5, 1996.
Steiner, Jennifer , "Kerberos: An Authentication Service for Open Network Systems", 726, Jan. 12, 1988.
Strunk, John et al., "Self-Securing Storage: Protecting Data in Compromised Systems", Symposium on Operating Systems Design and Implementation, 726, 2000.
Conti, Mauro, et al. "Crêpe: A system for enforcing fine-grained context-related policies on android." IEEE Transactions on Information Forensics and Security 7.5 (2012): 1426-1438.

* cited by examiner

TIME-BASED FUNCTIONALITY RESTRICTIONS

CROSS REFERENCE TO RELATED APPLICATIONS

This is a continuation application that claims priority to and the benefit of U.S. Non-provisional patent application Ser. No. 13/862,380, entitled "TIME-BASED FUNCTIONALITY RESTRICTIONS" and filed on Apr. 13, 2013, which is incorporated by reference as if set forth herein in its entirety.

BACKGROUND

Today, many governments are implementing legislative penalties for businesses that provide their employees with access to business resources and/or device functionality outside of standard workday hours. Also, many businesses experience loss of revenue as a result of their employees' access to personal resources and/or device functionality during standard workday hours. Automated compliance rules may be provided for handling situations where certain functionality on a device is restricted during certain time periods, such as during and/or outside standard workday hours. Conventional solutions often restrict the use of a device entirely to prevent the device from performing such functionality that is restricted during such time periods.

SUMMARY

This Summary is provided to introduce a selection of concepts in a simplified form that are further described below in the Detailed Description. This Summary is not intended to identify key features or essential features of the claimed subject matter. Furthermore, this Summary is not intended to limit the claimed subject matter's scope.

Time-based functionality restrictions may be provided. Periodic scans may be performed to identify requested functionality and determine whether the functionality is restricted according to a time constraint. Upon identifying a request to perform functionality that is restricted according to a time constraint, the request to perform the functionality may be denied. The time constraints may be defined according to, amongst other possible time periods, standard workday hours.

It is to be understood that both the foregoing general description and the following Detailed Description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the Detailed Description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
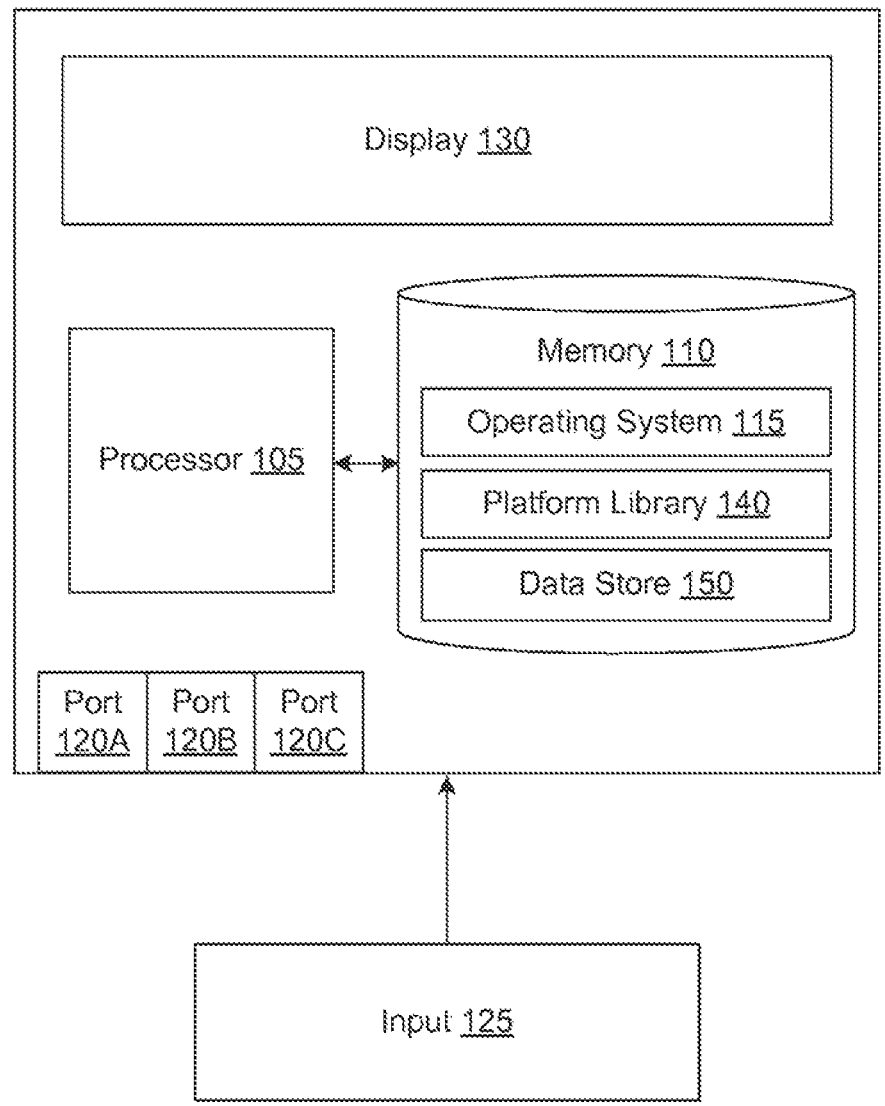
FIG. 1 is a block diagram of a user device.

The following Detailed Description refers to the accompanying Figures. Wherever possible, the same reference numbers are used in the Figures and the following description to refer to the same or similar elements. While embodiments of the disclosure may be described, modifications, adaptations, and other implementations are possible. For example, substitutions, additions, or modifications may be made to the elements illustrated in the Figures, and the methods described herein may be modified by substituting, reordering, or adding stages to the disclosed methods. Accordingly, the following Detailed Description does not limit the disclosure. Instead, the proper scope of the disclosure is defined by the appended claims.

Time-based functionality restrictions may be provided by certain methods, apparatuses, and non-transitory computer readable medium as described herein. Methods for providing time-based functionality restrictions may include methods performed by software applications. Examples of such methods may include those performed by device management server applications executed on servers and device management agent applications executed on user devices. User devices may include smartphones, tablets, laptops, desktops and other computing devices. Moreover, apparatuses for providing time-based functionality restrictions may include devices executing software applications that perform methods for providing time-based functionality restrictions. Examples of such apparatuses may include servers executing device management server applications and user devices executing device management agent applications. Additionally, non-transitory computer readable mediums for providing time-based functionality restrictions may include software applications that when executed cause a computing device to perform the steps of the methods for providing time-based functionality restrictions. Examples of such non-transitory computer readable mediums may include device management server applications executable by servers and device management agent applications executable by user devices.

Providing time-based functionality restrictions may begin by identifying requests to perform functions on user devices and/or identifying functions being performed on user devices. Compliance rules associated with the user devices may be identified and, based on such compliance rules, a determination may be made as to whether the functions requests and/or being performed are authorized to be performed by the user devices at the current time. If it is determined that the user devices are not authorized to perform the functions at the current time, a remedial action may be performed such as blocking the function being requested and/or being performed. If it is determined a second time that the users are not authorized to perform the functions at the current time, an escalated remedial action may be taken such as erasing business and/or personal data from the user device. Furthermore, if it is determined that the user devices are authorized to perform the functions at the current time, the user devices may be permitted to proceed with the request to perform functions and/or the functions being performed without interruption.

Time-based functionality restrictions may be implemented to enable and/or disable certain functionality on a user device during and/or outside of standard workday hours. For example, time-based functionality restrictions may ensure that employees only receive their business email on their smartphone during workdays and only receive their personal email on their smartphone outside workdays.

FIG. 1 is a block diagram of a User Device 100 comprising a Processor 105 and a Memory 110. Depending on the configuration and type of User Device, Memory 110 may comprise, but is not limited to, volatile (e.g. random access memory (RAM)), non-volatile (e.g. read-only memory (ROM)), flash memory, or any combination thereof. Memory 110 may store executable programs and related data components of various applications and modules for execution by User Device 100. Memory 110 may be coupled to Processor 105 for storing configuration data and operational parameters, such as commands that are recognized by Processor 105. User Device 100 may comprise, for example, a desktop computer, a laptop computer, a personal digital assistant, a cellular telephone, a set-top box, a music player, a web pad, a tablet computer system, a game console, and/or another device with like capability.

Basic functionality of User Device 100 may be provided by an Operating System 115 contained in Memory 100. Various programmed software applications may be executed by utilizing the computing resources in User Device 100. Applications stored in Memory 110 may be executed by Processor 105 (e.g., a central processing unit or digital signal processor) under the auspices of Operating System 115. For example, Processor 105 may be configured to execute applications such as web browsing applications, email applications, instant messaging applications, and/or other applications capable of receiving and/or providing data.

Data provided as input to and generated as output from the application(s) may be stored in Memory 110 and read by Processor 105 from Memory 110 as needed during the course of application program execution. Input data may be data stored in Memory 110 by a secondary application or other source, either internal or external to User Device 100, or possibly anticipated by the application and thus created with the application program at the time it was generated as a software application program. Data may be received via any of a plurality of (Communication) Ports 120A, 120B, and/or 120C of User Device 100. Communication Ports 120A, 120B, and/or 120C may allow User Device 100 to communicate with other devices, and may comprise components such as an Ethernet network adapter, a modem, and/or a wireless network connectivity interface. For example, the wireless network connectivity interface may comprise one and/or more of a PCI (Peripheral Component Interconnect) card, USB (Universal Serial Bus) interface, PCMCIA (Personal Computer Memory Card International Association) card, SDIO (Secure Digital Input-Output) card, NewCard, Cardbus, a modem, a wireless radio transceiver, and/or the like.

User Device 100 may also receive data as user input via an Input (Component) 125, such as a keyboard, a mouse, a pen, a stylus, a sound input device, a touch input device, a capture device, etc. A capture device may be operative to record user(s) and capture spoken words, motions and/or gestures, such as with a camera, microphone, and/or accelerometer. The capture device may comprise any speech and/or motion detection device capable of detecting the speech and/or actions of the user(s).

Data generated by applications may be stored in Memory 110 by the Processor 105 during the course of application program execution. Data may be provided to the user of User Device 100 during application program execution by means of a Display 130. Consistent with embodiments of this disclosure, Display 130 may comprise an integrated display screen and/or an output port coupled to an external display screen.

Memory 110 may also comprise a Platform Library 140. Platform Library 140 may comprise a collection of functionality useful to multiple applications, such as may be provided by an application programming interface (API) to a software development kit (SDK). These utilities may be accessed by applications as necessary so that each application does not have to contain these utilities thus allowing for memory consumption savings and a consistent user interface.

Furthermore, embodiments of this disclosure may be practiced in conjunction with a graphics library, other operating systems, or any other application program and is not limited to any particular application or system. The devices described with respect to the Figures may have additional features or functionality. For example, User Device 100 may also include additional data storage devices (removable and/or non-removable) such as, for example, magnetic disks, optical disks, or tape (not shown).

User Device 100 may store device and/or user-specific information in a Data Store 150, such as a device profile, a plurality of credentials and/or a plurality of user preferences. A device profile may comprise an indication of the current position of User Device 100 and/or indications of the hardware, software, and security attributes that describe User Device 100. For instance, the device profile may represent hardware specifications of User Device 100, version and configuration information of various software program and hardware components installed on User Device 100, data transmission protocols enabled on User Device 100, version and usage information of various resources stored on User Device 100, and/or any other attributes associated with the state of User Device 100. The device profile may further comprise data indicating a date of last virus scan of User Device 100, a date of last access by an IT representative, a date of last service by the IT representative, and/or any other data indicating maintenance and usage of User Device 100. Furthermore, the device profile may comprise indications of the past behavior of associated users, such as resources accessed, charges for resources accessed, and the inventory accessed from such resources.

The credentials may comprise a plurality of user credentials and/or a plurality of device credentials. The user credentials may comprise a plurality of PIN numbers, simple passwords, complex passwords, usernames, account identifiers, biometric indicators, and/or other data capable of authenticating the user of the User Device 100. The device credentials may comprise a plurality of hardware identifiers, serial numbers, IMEI numbers, phone numbers, and/or other data capable of authenticating the User Device 100. The user preferences may comprise a listing of factors that may affect the experience of the user of User Device 100. In particular, the user preferences may include indications of the user's age, gender, bodily traits, preferred resource types, preferred venue resources, and combinations thereof.

Figure 2:
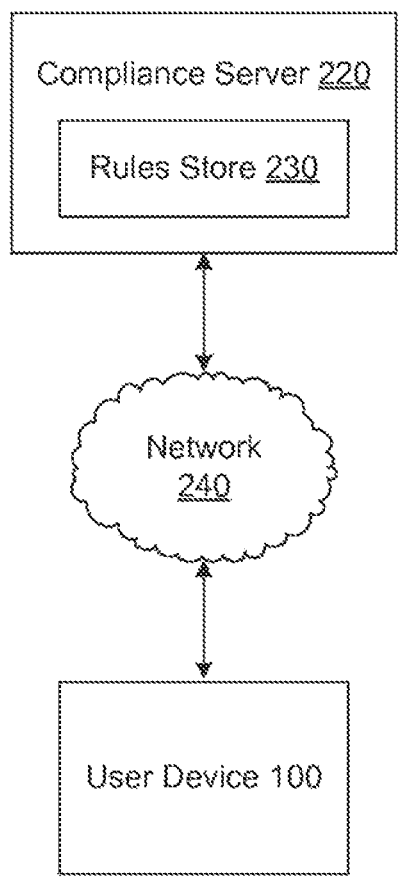
FIG. 2 is a block diagram of an operating environment.

FIG. 2 is a block diagram view of an operating environment 200 comprising User Device 100 in communication with a Compliance Server 220 via a Network 240. The Compliance Server 220 may comprise, for example, cloud-based solutions, server computers and/or any other system providing device management capability. For purposes of convenience, the Compliance Server 220 is referred to herein in the singular, although it is understood that a plurality of servers may be employed in the arrangements as descried herein. Furthermore, in some embodiments, multiple Compliance Servers 220 may operate on the same server computer. The components executed on the Compliance Server 220, for example, may comprise various applications, services, processes, systems, engines, or functionality not disclosed in detail herein.

The Compliance Server 220 may comprise a Rules Store 230 comprising a plurality of compliance rules that may be applicable to User Device 100. While the Rules Store 230 is shown as within the Compliance Server 220, the Rules Store 230 may alternately be within the User Device 100 and may be remotely updated periodically by Compliance Server 220 according to common over-the-air (OTA) updating methods. Attempts by User Device 100 to perform certain functionality on User Device 100 may require User Device 100 to be in compliance with one and/or more of the compliance rules. Depending on the sensitivity of a given functionality, different compliance rules may be necessary to ensure that the functionality is adequately restricted. Some functionality may only require ensuring that the proper user is requesting the functionality. Other resources may require compliance with more stringent authorization rules, such as determining whether the functionality is restricted during certain time windows. Accordingly, User Device 100 and/or Compliance Server 220 may be operative to determine whether the user of User Device 100 is authorized to perform requested functionality at the time the user requests to perform such functionality.

In some embodiments, an agent application executed on User Device 100 may make the compliance determination based on the device profile, credentials, and/or user preferences. For instance, an agent application may monitor the calls by applications on User Device 110 to the Operating System 115 of User Device 100 to determine whether User Device 110 seeks to perform functionality that may violate a given compliance rule. Additionally, an agent application on User Device 100 may approve and/or deny the associated functionality requests. For instance, the agent application may instruct Operating System 115 on User Device 100 to disable the camera of User Device 120 in response to a determination that a compliance rule specifies that the camera cannot be used at the time of the request by the User Device 100 to operate the camera.

In some embodiments, an agent application executed on User Device 100 may rely on Compliance Server 220 to determine whether a given functionality request on User Device 100 is permitted according to the compliance rules. For instance, the agent application may transmit a functionality request, a device profile, credentials, and/or user preferences to Compliance Server 220 so that Compliance Server 220 may determine whether User Device 110 seeks to perform functionality that may violate a given compliance rule. Additionally, Compliance Server 220 may approve and/or deny the associated functionality requests. For instance, Compliance Server 220 may instruct an agent application on User Device 100 to instruct Operating System 115 on User Device 100 to disable the email transmission port of User Device 120 in response to a determination that a compliance rule specifies that email cannot be received at the time of the request by the User Device 100 to receive email. Compliance Server 220 may, for instance, instruct an agent application and/or Operating System 115 of User Device 100 via application programming interface (API) calls and/or other programming that allows control and/or instruction of User Device 100 by applications and/or services communicatively coupled to User Device 100.

In some embodiments, the compliance rules may comprise device settings and/or executable instructions that define which functionality the Operating System 115 of User Device 100 is authorized to perform at a given time. In certain embodiments, the compliance rules may specify that functionality related to personal use of User Device 100 may not be performed during standard workday hours, and/or that functionality related to business use of User Device 100 may not be performed outside standard workday hours. For example, the compliance rules may specify that business applications may only be executed on User Device 100 between 9 AM and 5 PM on weekdays, and may specify that personal applications may only be executed on User Device 100 between 5 PM and 9 AM on weekdays and/or anytime on weekends. Furthermore, the compliance rules may comprise a list of functions, such as those provided by APIs associated with Operating System 115 and/or Platform Library 140, that may be treated as protected functions. Calls to these functions, such as calls to retrieve login credentials, may result in checks by User Device 100 and/or Compliance Server 220 for compliance with the compliance rules.

The Network 240 may comprise, for example, any type of wired and/or wireless network such as a wireless local area network (WLAN), a wireless wide area network (WWAN), Ethernet, fiber-optic network, and/or any other type of wired and/or wireless network now known or later developed. Additionally, the Network 240 may be or include the Internet, intranets, extranets, microwave networks, satellite communications, cellular systems, PCS, infrared communications, global area networks, or other suitable networks, etc., or any combination of such networks.

Figure 3:
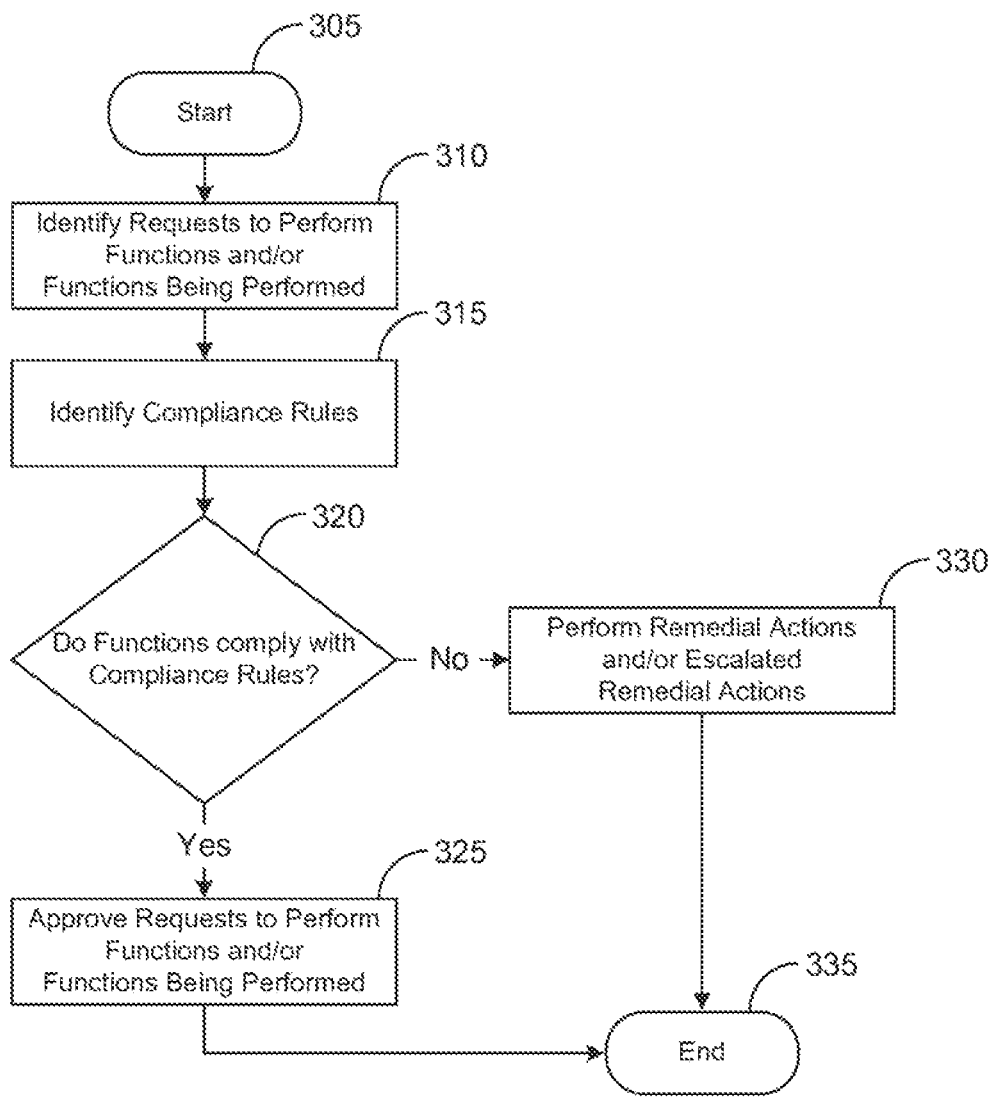
FIG. 3 is a flow chart illustrating a method for providing time-based functionality restrictions.

FIG. 3 is a flow chart setting forth the general stages involved in a method 300 consistent with embodiments of this disclosure for providing time-based functionality restrictions. Ways to implement the stages of method 300 will be described in greater detail below. For purposes of illustration, not limitation, method 300 is described with respect to User Device 100 in communication with Compliance Server 220. Method 300 may begin at starting block 305 and proceed to stage 310 and identify requests to perform functions on a User Device 100 and/or functions being performed on a User Device 100. For example, a request to access business email on a User Device 100 may be identified in stage 310.

From stage 310, method 300 may advance to stage 315 where method 300 identifies a plurality of compliance rules associated with the User Device 100. In some embodiments, the compliance rules may specify at least one time period when the User Device 100 is authorized to perform a given function. Examples of compliance rules include compliance rules that specify that business functions may only be accessed during business hours and compliance rules that specify that personal functions may only be accessed during personal hours. From stage 315, method 300 may advance to stage 320 where method 300 determines whether the functions associated with the User Device 100 comply with the compliance rule associated with the User Device 100. For instance, a request to access a business email account on User Device 100 outside of workday hours would not comply with a compliance rule specifying that User Device 100 is only authorized to access business email accounts during workday hours.

If it is determined that the functions do not comply with the compliance rules, method 300 may advance to stage 330 and perform a remedial action. Remedial actions may be taken on a User Device 100 and/or remote services communicatively coupled to a User Device 100. Remedial actions may include disabling hardware features of a User Device 100, disabling software features of a User Device 100, disabling applications of a User Device 100, erasing the contents of memory locations of a User Device 100, restoring a User Device 100 to its factory state, and queuing a function until a User Device 100 is authorized to perform the function. Disabling hardware features of a User Device 100 may include disabling the Camera, Microphone and/or other features of a User Device 100 that are available on User Device 100. Disabling software features of a User Device 100 may include disabling Sir and/or other software features provided by Operating System 115 and/or other factory-installed software of User Device 100. Disabling applications of a User Device 100 may include uninstalling and/or blocking execution of applications of a User Device 100, such as email applications, browser applications, content management applications, application stores and/or the like.

Erasing the contents of memory locations may include content associated with business data, where business data may include electronic files, applications and/or other data associated with an enterprise, business, and/or other organization. Erasing the contents of memory locations may also include content associated with personal data, where personal data may include electronic files, applications and/or other data that is not owned by and/or otherwise exclusively claimed and/or controlled by an enterprise, business and/or other organization. Restoring a User Device 100 to its factory state may include erasing the contents of all memory locations associated with data that was not present when the User Device 100 left the manufacturer and/or factory. Furthermore, remedial actions may be taken with respect to remote services communicatively coupled to a User Device 100, such as by blocking data transmissions from a User Device 100 to a remote service, blocking data transmissions from a remote service to a User Device 100, and erasing the contents of memory locations of a remote service. Once a remedial action is performed, method 300 may end at stage 335.

In some instances, the method 300 may repeat stage 330 to determine whether the functions that previously did not comply with the compliance rules now comply with the compliance rules. If it is determined that the functions, once again, do not comply with the compliance rules, the method 300 may perform at least one escalated remedial action. Certain remedial actions, such as erasing the contents of memory locations of a User Device 100 and restoring a User Device 100 to its factory state, may be more drastic than the other remedial actions disclosed and thereby classified as escalated remedial actions in such embodiment. Accordingly, if a function does not comply with the compliance rules for a second or subsequent time, an escalated remedial action may be performed. Once an escalated remedial action is performed, method 300 may end at stage 335.

If the function complies with the compliance rules at stage 320, method 300 may advance to stage 330 and approve the requests to perform functions on a User Device 100 and/or the functions being performed on a User Device 100. For instance, the requests to perform functions and/or the functions being performed may be approved by no action being taken by the method 300. Upon completion of stage 330, method 300 may end at stage 335.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above.

Rather, the specific features and acts described above are disclosed as example for embodiments of the disclosure.

What is claimed is:

1. A method, comprising:
identifying, using an agent application, a request for an application executed in a user device based on detecting an operating system call made by the application on the user device, wherein the user device has access to a first account and a second account for the application;
identifying, using the agent application, a compliance rule associated with the application for the user device, wherein the compliance rule specifies that the user device is authorized to access the first account for the application within a first time period on a particular day and the user device is authorized to access the second account for the application within a second time period;
determining, using the agent application, that the request for accessing the first account of the application does not comply with the compliance rule based on a time of the request and the first time period;
performing, using the agent application, at least one remedial action by instructing an operating system to disable access to the first account for the application; and
enabling, using the agent application, the user device to access to the second account for the application based at least in part on the time of the request and the second time period.

2. The method of claim 1, wherein the request comprises accessing an email account and the at least one remedial action comprises instructing the operating system to disable an email port of the user device.

3. The method of claim 1, wherein determining that the request for the application does not comply with the compliance rule is further based on a user credential.

4. The method of claim 1, wherein the first account comprises a business account and the second account is a personal account.

5. The method of claim 1, wherein the time of the request represents a first attempt for the request, and further comprising:
determining, using the agent application, that the request for the application does not comply with the compliance rule based on a second attempt for the request in an instance in which the first attempt has been denied; and
performing, using the agent application, an escalated remedial action on the user device.

6. The method of claim 5, wherein the escalated remedial action comprises at least one of erasing business data on the user device that is associated with the application or restoring the user device to a factory state.

7. The method of claim 1, wherein performing the at least one remedial action by instructing the operating system to disable access to the account for the application further comprises at least one of:
blocking data transmission from the user device to a remote service for the account of the application; or
blocking data transmission from the remote service to the user device for the account of the application.

8. A system, comprising,
a user device that comprises a processor;
a memory in communication to the user device, wherein the memory comprises a plurality of machine instructions that, when executed, cause the user device to at least:
identify a functionality request for an application executed in the user device based on detecting an operating system call made by the application on the user device, wherein the user device has access to a first account and a second account for the application;
identify a compliance rule associated with the application for the user device, wherein the compliance rule specifies that the user device is authorized to access the first account for the application within a first time period on a particular day and the user device is authorized to access the second account for the application within a second time period on the particular day;
determine that the functionality request for accessing the first account of the application does not comply with the compliance rule based on a time of the functionality request and the first time period;
perform at least one remedial action by instructing an operating system to disable access to the first account for the application; and
authorize the user device to access to the second account for the application based at least in part on the time of the request and the second time period.

9. The system of claim 8, wherein the first account is a first email account and the second account is a second email account, wherein the application is an email application.

10. The system of claim 8, wherein determining that the functionality request for the application does not comply with the compliance rule is further based on an authorized time window for the functionality request.

11. The system of claim 8, wherein the first account comprises a business account and the second account is a personal account.

12. The system of claim 8, wherein the time of the functionality request represents a first attempt for the functionality request, and further comprising:
determine that the functionality request for the application does not comply with the compliance rule based on a second attempt for the functionality request in an instance in which the first attempt has been denied; and
perform an escalated remedial action on the user device.

13. The system of claim 12, wherein the escalated remedial action comprises at least one of erasing business data on the user device that is associated with the application or restoring the user device to a factory state.

14. The system of claim 8, wherein performing the at least one remedial action by instructing the operating system to disable access to the account for the application further comprises at least one of:
blocking data transmission from the user device to a remote service for the account of the application; or
blocking data transmission from the remote service to the user device for the account of the application.

15. The system of claim 8, wherein the plurality of machine instructions that, when executed, cause the user device to at least:
enabling access to the first account for the application based at least in part on an expiration of the first time period.

16. A non-transitory computer-readable medium embodying program instructions executable in a client computing device that, when executed by the client computing device, cause the client computing device to at least:
identify a functionality request for an application executed in the client computing device based on detecting an operating system call made by the application on the client computing device, wherein the client computing device has access to a first account and a second account for the application;

identify a compliance rule associated with the application for the client computing device, wherein the compliance rule specifies that the client computing device is authorized to access the first account for the application within a first time period on a particular day and the client computing device is authorized to access the second account for the application within a second time period on the particular day;

determine that the functionality request for accessing the first account of the application does not comply with the compliance rule based on a time of the functionality request and the first time period;

perform at least one remedial action by instructing an operating system to disable access to the first account for the application; and authorize the client computing device to access to the second account for the application based at least in part on the time of the request and the second time period.

17. The non-transitory computer-readable medium of claim 16, wherein the first account is a first email account and the second account is second email account, wherein the application is an email application.

18. The non-transitory computer-readable medium of claim 16, wherein determining that the functionality request for the application does not comply with the compliance rule is further based on a user credential.

19. The non-transitory computer-readable medium of claim 18, wherein the first account comprises a business account and the second account is a personal account.

20. The non-transitory computer-readable medium of claim 16, wherein the time of the functionality request represents a first attempt for the functionality request, and further comprising:

determine that the functionality request for the application does not comply with the compliance rule based on a second attempt for the functionality request in an instance in which the first attempt has been denied; and perform an escalated remedial action on the client computing device.

21. The non-transitory computer-readable medium of claim 20, wherein the escalated remedial action comprises at least one of erasing business data on the client computing device that is associated with the application or restoring the client computing device to a factory state.

* * * * *